United States Patent [19]

Ogura et al.

[11] Patent Number: 6,084,882
[45] Date of Patent: *Jul. 4, 2000

[54] DETOUR PATH DETERMINATION METHOD

[75] Inventors: Takao Ogura; Shigeo Amemiya; Koji Tezuka; Takafumi Chujo, all of Kawasaki, Japan

[73] Assignee: Fujitsu Limited, Kawasaki, Japan

[*] Notice: This patent is subject to a terminal disclaimer.

[21] Appl. No.: 08/406,783

[22] Filed: Mar. 20, 1995

Related U.S. Application Data

[63] Continuation of application No. 08/274,152, Jul. 14, 1994, abandoned, which is a continuation of application No. 07/969,316, Mar. 24, 1993, abandoned.

[30] Foreign Application Priority Data

Jun. 18, 1991 [JP] Japan ................................. 3-146127
Jun. 16, 1992 [WO] WIPO ....................... PCT/JP92/00764

[51] Int. Cl.[7] .............................. H04L 29/14; H04L 12/12
[52] U.S. Cl. ........................... 370/409; 370/410; 340/827
[58] Field of Search .............................. 370/13, 16, 16.1, 370/60, 60.1, 94.1, 94.2, 58.1, 58.2, 58.3, 241, 242, 243, 244, 245, 246, 247, 248, 249, 250, 252, 237, 351, 389, 392, 400, 401, 402, 408, 409, 410, 428; 371/8.1, 8.2, 11.1, 11.2; 340/825.03, 827, 825.01

[56] References Cited

U.S. PATENT DOCUMENTS

| | | | |
|---|---|---|---|
| 4,853,927 | 8/1989 | Wenzel . | |
| 4,956,835 | 9/1990 | Grover | 370/16 |
| 5,016,243 | 5/1991 | Fite, Jr. | 370/16 |
| 5,093,824 | 3/1992 | Coan et al. | 370/16 |
| 5,130,974 | 7/1992 | Kawamura et al. | 370/16 |
| 5,218,601 | 6/1993 | Chujo et al. | 370/16 |
| 5,233,600 | 8/1993 | Pekarske | 370/16 |
| 5,235,599 | 8/1993 | Nishimura et al. | 370/16 |
| 5,241,533 | 8/1993 | Kimoto et al. | 370/16 |

FOREIGN PATENT DOCUMENTS

| | | |
|---|---|---|
| 64-16041 | 1/1989 | Japan . |
| 2-76435 | 3/1990 | Japan . |
| 2-78373 | 3/1990 | Japan . |
| 2-98257 | 4/1990 | Japan . |
| 3-58542 | 3/1991 | Japan . |
| 3-112239 | 5/1991 | Japan . |
| 91/07040 | 5/1991 | WIPO . |

OTHER PUBLICATIONS

Atkins "Path Control: The Transport Network of SNA", *IEEE Transactions on Communications*, Apr. 1980, pp. 533–535.

*Primary Examiner*—Huy D. Vu
*Attorney, Agent, or Firm*—Staas & Halsey

[57] ABSTRACT

A detour path determination method wherein each node on a determined detour path stores in advance first and second nodes upstream of each node as well as an identifier(s) of a packet directional path(s); a number of an identifier(s) of a packet directional path(s) required for switching in each link extending from a downstream node one node downstream of each node on the detour path are set for respective nodes on the detour path beginning from the terminal node upstream; the identifier(s) of the packet directional path(s) set as above, and an identifier(s) of a corresponding packet directional path(s) at a start node of the detour path, are sent to a node one node upstream of the above each node; the start node updates a identification data table at the node, by an identifier(s) of a packet directional path(s) set downstream of the start node based on the corresponding identifier(s) of packet directional path(s) at a start node of the detour path, when the start node receives the above identifier(s) (FIG. 1).

11 Claims, 11 Drawing Sheets

Fig. 4

IDENTIFYING NUMBER OF PACKET DIRECTIONAL PATH

| LINK | | NODE | |
|---|---|---|---|
| L1 | FIRST ADJACENT NODE | A | 1 0 0 1 |
| | SECOND ADJACENT NODE | | |
| L2 | FIRST ADJACENT NODE | B | 0 0 0 1 |
| | SECOND ADJACENT NODE | A | 1 0 0 1 |
| L3 | FIRST ADJACENT NODE | C | 0 1 0 1 |
| | SECOND ADJACENT NODE | B | 0 0 0 1 |
| L4 | FIRST ADJACENT NODE | D | 0 1 1 1 |
| | SECOND ADJASENT NODE | C | 0 1 0 1 |

MAINTENANCE PACKET (MESSAGE)

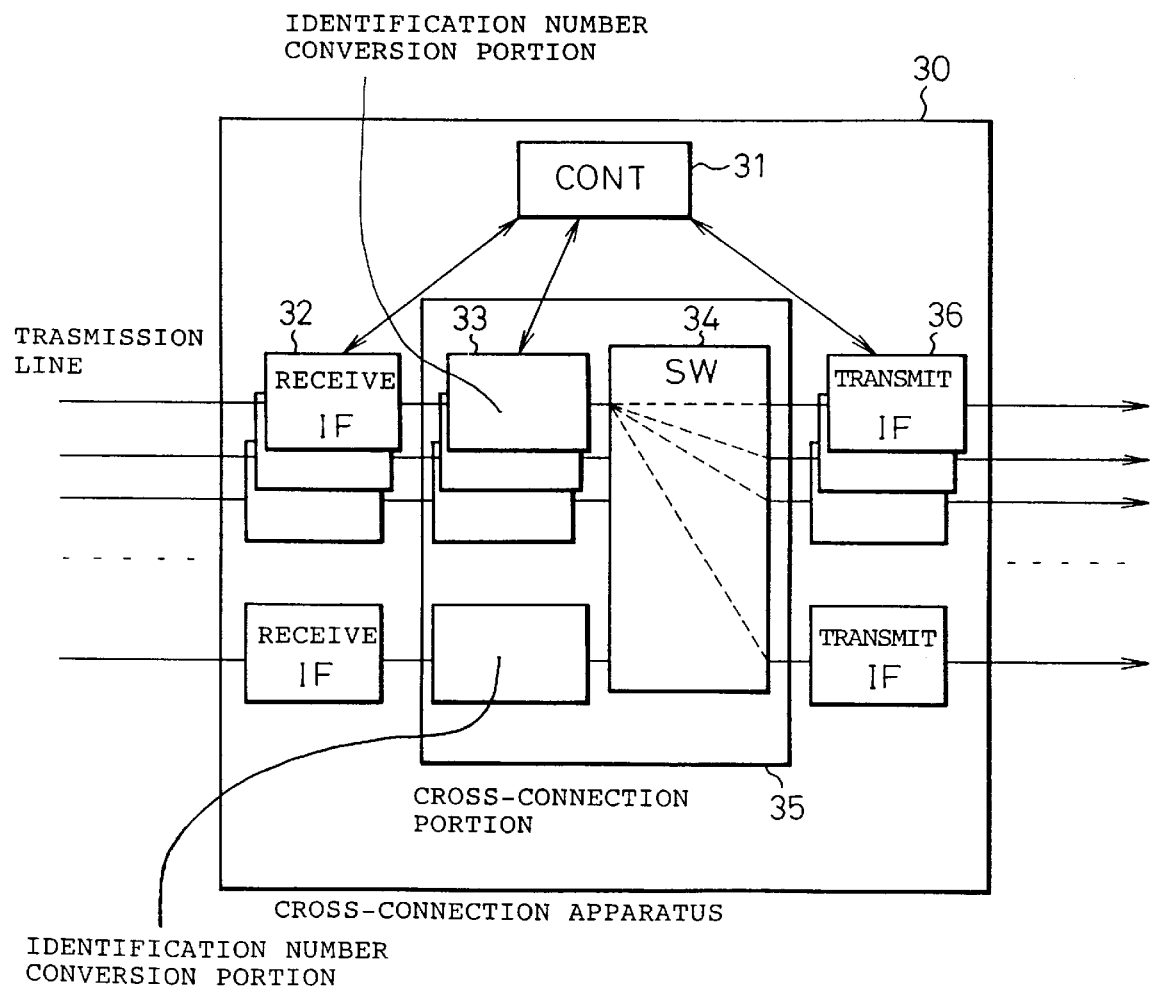

DETOUR PATH DETERMINATION METHOD

This application is a continuation, of application Ser. No. 08/274,152, filed Jul. 14, 1994, now abandoned, which is a continuation of application Ser. No. 07/969,316, filed Mar. 24, 1993, now abandoned.

TECHNICAL FIELD

This invention relates to a detour path determination method for determining an identifier (identification data) of a packet directional path of a detour path detouring one node on a preset packet directional path(s) (a bundle of a packet signal channels) in a high speed packet communication network which includes a plurality of nodes, and in which adjacent nodes of the plurality of nodes are linked with one another.

The high speed packet communication network to which the present invention is applied is as follows.

A logical packet communication channel from a sender of a packet to a receiver is generally set through a plurality of nodes inside a network, and a packet directional path containing a plurality of such communication channels is set between the nodes. Generally, a physical transmission line between the nodes (such as an optical fiber) contains a plurality of packet directional paths as described above. The packet directional path(s) is each identified by an identification number, and each of the nodes existing in the packet directional path has a cross-connection apparatus for connecting a plurality of incoming packet directional path(s) to outgoing packet directional path(s) respectively corresponding to the incoming packet directional path(s). Which incoming packet directional path should be connected to which outgoing packet directional path is given in advance as routing information to each node apparatus from an operation system which manages the high speed packet communication network. Furthermore, each packet is provided with an area for indicating an identification number (identification data of a packet directional path) for identifying the packet directional path while it is transferred in each packet directional path, and the content of this area is re-written in the cross-connection apparatus inside each node in accordance with a conversion table provided to the cross-connection apparatus. Accordingly, it is necessary for each node to recognize which packet directional path is set as each of the incoming and outgoing packet directional path(s) and what identification number the packet directional path has.

Each of a plurality of nodes described above has an identification data conversion table 4 for storing identifier(s) of a packet directional path(s), which is in use, and identifier(s) of a packet directional path(s), which is out of use, for links that connect each node to all of its adjacent nodes.

BACKGROUND ART

When trouble occurs at a node or in a link inside the high speed packet communication network, a detour path detouring the node or the link at which the trouble occurs must be set. Furthermore, an identifier(s) of a packet directional path(s) must be set for each link of this detour path.

In the conventional communication network, a network control center monitors the state of transmission lines in the whole network, and when trouble is informed thereto from a node, the control center searches for a path detouring the node or link at which the trouble occurs, and switches the line. In such a centralized control system, there is a problem that it takes a long time to switch the path and a heavy burden is imposed on the network control-center.

Therefore, in the high speed packet communication network, a system which automatically searches for a detour path by flooding from a node detecting the trouble has been developed. In this flooding: the node which detects the trouble sends a detour path search message for indicating the node itself as a terminal node of the detour path, and a start node of the detour path, to links in all directions connected thereto; and each node which receives the detour path search message, when the node is not the start node, inserts information on the node to indicate that the node is a node the detour path search message passed through, and sends the detour path search message, to links connected thereto in all directions if the node itself is not the start node. If the node which receives the detour path search message is the start node, it sends a detour path setting message which is composed so that the detour path setting message traces back through the nodes through which the detour path search message has passed, to the terminal node, where information on the nodes to be passed through is contained in the detour path search message. In this way, the detour path is determined.

For the detour path determined in the manner described above, however, the identifier(s) of the packet directional path(s) in each link must be set. This identifier(s) of the packet directional path(s) must be made to correspond to the identifier(s) of the packet directional path(s) which has been set for an outgoing link of the start node in the original packet directional path(s).

DISCLOSURE OF THE INVENTION

It is an object of the present invention to provide a detour path determination method for setting an identifier(s) of a packet directional path(s) in each link of a detour path maintaining its correspondence with an identifier(s) of a packetdirectional path(s) which is set to an outgoing link of a start node in an original packet directional path.

According to the first aspect of the present invention, there is provided a detour path determination method for determining an identifier(s) of a packet directional path(s) in a detour path detouring one node in preset packet directional path(s) in a high speed communication network including a plurality of nodes, adjacent ones of which are linked with one another and each of which has an identification data conversion table for storing an identifier(s) of a packet directional path(s) which is in use, and an identifier(s) of a packet directional path(s) which is out of use, for links between the node itself and all adjacent nodes, which method comprises: a packet directional path memory step for allowing each of the plurality of nodes to store information on the identifier(s) of the packet directional path(s) used in a link extending from a first upstream node one node upstream of each node on a preset route, an identifier(s) of a packet directional path(s) used in a link extending from a second upstream node to the first upstream node, and the second upstream node, for each of the preset packet directional path(s) passing through each node described above; a detour path determination step for determining a detour path detouring the above one node and having the first upstream node upstream of the above one node as a start node and a first downstream node downstream of the above one node as a terminal node, wherein each node other than the start node on the detour path stores a first upstream node one node upstream of each node on the detour path; a first detour packet directional path setting step wherein the terminal node sets afresh the same number of an identifier(s) of a packet directional path(s) as the number of an identifier(s) of a packet directional path(s) used in a link extending from the second upstream node to the first upstream node upstream of the terminal node on the preset packet directional path(s), among identifier(s) of non-used packet directional path(s) of a link extending from a third upstream node one node upstream of the terminal node to the terminal node itself in the detour path, in accordance with determination of the detour path, so as to use the identifier(s) in the detour path, and updates the identification data conversion table in the terminal; a first packet directional path setting data informing step wherein the terminal node informs to the third upstream node one node upstream thereof on the detour path, the identifier(s) of the packet directional path(s) set afresh in the first detour packet directional path setting step, and the information on the identifier(s) of the packet directional path(s) used in the link extending from the second upstream node to the first upstream node upstream thereof, where the link is to be detoured by the detour path, the information on the identifier(s) of the packet directional path(s) used in the link to be detoured corresponds to the identifier(s) of the packet directional path(s) set afresh in the first detour packet directional path setting step, and the information on the identifier(s) of the packet directional path(s) used in the link to be detoured is stored in the pass memory means; a second detour packet directional path setting step wherein each node other than the terminal node and the start node in the detour path receives from a second downstream node one node downstream of the above each node in the detour path, the identifier(s) of the packet directional path(s) set afresh at the second downstream node downstream thereof in a link extending from the above each node itself to the second downstream node in the detour path, and information on the identifier(s) of the packet directional path(s) used in a link extending from the second upstream node upstream of the terminal node to the first upstream node upstream of the terminal node in the original packet directional path(s) corresponding to the identifier(s) of the packet directional path(s) set afresh, sets afresh corresponding to the identifier(s) of the packet directional path(s) set afresh at the second downstream node and to be used in the detour path, the same number of an identifier(s) of a packet directional path(s) as the number of the identifier(s) of the packet directional path(s) set afresh at the second downstream node, among identifier(s) of the non-used packet directional path(s) in a link extending from a fourth upstream node upstream thereof to the above each node itself in the detour path, and updates the identification data conversion table in the node; a second packet directional path setting data informing step wherein the above each of nodes other than the terminal node and the start node informs to the fourth upstream node one node upstream thereof in the detour path, of the identifier(s) of the packet directional path(s) set afresh in the second detour packet directional path setting means and the information on the identifer(s) of the packet directional path(s) used in the link extending from the second upstream node upstream of the terminal node to the first upstream node upstream of the terminal node; and an updating step wherein the start node of the above determined detour path receives from a third downstream node one node downstream thereof on the detour path, the identifier(s) of the packet directional path(s) set afresh at the third downstream node one node downstream thereof in a link extending from the start node itself to the third downstream node on the detour path and the information on the identifier(s) of the packet directional path(s) corresponding to the identifier(s) of the newly set packet directional path(s) and used in the link extending from the second upstream node upstream thereof and the first upstream node in the original packet directional path(s), and updates the identification data conversion table at the start node itself by the identifier(s) of the newly set packet directional path(s) on the basis of the information on the identifier(s) of the original packet directional path(s).

According to the second aspect of the present invention, there is provided an identification data determination system of packet directional path(s) in a detour path for determining an identifier(s) of a packet directional path(s) in the detour path detouring one of nodes on preset packet directional path(s) in a high speed packet communication network including a plurality of nodes, adjacent ones of which are linked with one another and each of which has an identification data conversion table for storing an identifier(s) of a packet directional path(s) in use and out of use, respectively, wherein each of the plurality of nodes includes: packet directional path memory means for storing an identifier(s) of a packet directional path(s) used in a link extending from a first upstream node one node upstream of the above each node to the above each node itself on the preset packet directional path(s) for each of the preset packet directional path(s) passing through the above each node, information on an identifier(s) of a packet directional path(s) used in a link extending from a second upstream node to the first upstream node, and the first and second upstream nodes; detour path determination means for determining a detour path detouring the first upstream node one node upstream of the above each node in each of the preset packet directional path(s) setting the second upstream node on the preset packet directional path(s) as a start and the above each node itself as a terminal node, for each of packet directional path(s) passing through the above each node itself; and detour path upstream node memory means for storing a third upstream node one node upstream of the above each node in a detour path passing through the above each node itself and using a node other than the above each node as a terminal node; first detour packet directional path setting means for setting afresh the same number of an identifier(s) of a packet directional path(s) as the number of the identifier(s) of the packet directional path(s) used in the link extending from the second upstream node to the first upstream node upstream of the above each node on the preset packet directional path(s) among the identifier(s) of the non-used packet directional path(s) of a link extending from a fourth upstream node one node upstream of the above each node to the above each node itself on the detour path in accordance with the determination of the detour path when the above each node itself is the terminal node of the determined detour path, to use the newly set identifier(s) for the detour path, and for updating the identification data conversion table in the above each node; first packet directional path identification data informing means for informing to the fourth upstream node on the detour path, when the above each node itself is the terminal node of the detour path determined, the identifier(s) of the packet directional path(s) set afresh by the first detour packet directional path setting means, and information on the identifier(s) of the packet directional path(s) used in the link extending from the second upstream node to the first upstream node on the preset packet directional path(s), where the link is to be detoured by the detour path, the information on the identifier(s) of the packet directional path(s) used in the link to be detoured corresponds to the identifier(s) of the packet directional path(s) set afresh in the first detour packet directional path setting means, and the information on the identifier(s) of the packet directional path(s) used in the link to be detoured is stored in the pass memory means; second detour packet directional path setting means for setting afresh corresponding to the identifier(s) of the packet directional path(s) set afresh at a first downstream node one node downstream of the above each node on the detour path, and to be used in the detour path, the same number of an identifier(s) of a packet directional path(s) as the number of the identifier(s) of the packet directional path(s) set afresh at the first downstream node one node downstream of the above each node on the detour path, among the identifier(s) of the non-used packet directional path(s) of the link extending from the third upstream node to the above each node itself on the detour path, when the above each node is a node passed through by the determined detour path and when the above each node is informed from the first downstream node, of the identifier(s) of the packet directional path(s) set afresh at the first downstream node, and information on the identifier(s) of the packet directional path(s) used in the link extending from the second upstream node to the first upstream node on the preset packet directional path(s) and corresponding to the identifier(s) of the packet directional path(s) set afresh at the first downstream node, and the second detour packet directional path setting means updating the identification data conversion table of the packet directional path; second packet directional path setting data informing means for informing to the third upstream node upstream of the above each node itself on the detour path, the identifier(s) of the packet directional path(s) set afresh by the second detour packet directional path setting means and information on the identifier(s) of the packet directional path(s) used in the link extending from the second upstream node to the first upstream node on the preset packet directional path(s), when the above each node is a node passed through by the determined detour path; and updating means for updating the identification data conversion table in the above each node itself by the identifier(s) of the packet directional path(s) set afresh at a second downstream node in a link extending from the above each node itself to the third downstream node one node downstream of the above each node on the detour path, on the basis of information on the identifier(s) of the packet directional path(s) used in the link extending from the second upstream node to the first upstream node on the preset packet directional path(s) and corresponding to the identifier(s) of the original packet directional path(s), when the above each node is the start node of the determined detour path and when the above each node is informed from a third downstream node one node downstream of the above each node, of the identifier(s) of the set-afresh packet directional path(s), and the information on the identifier(s) of the original packet directional path(s).

BRIEF DESCRIPTION OF DRAWINGS

FIG. 4 is a table showing an example of a maintenance packet in the packet directional path memory step;

FIG. 11 is an explanatory diagram illustrating the outline of the construction of a cross-connection apparatus as a node apparatus in an embodiment of the present invention.

BEST MODE FOR CARRYING OUT THE INVENTION

Figure 1:
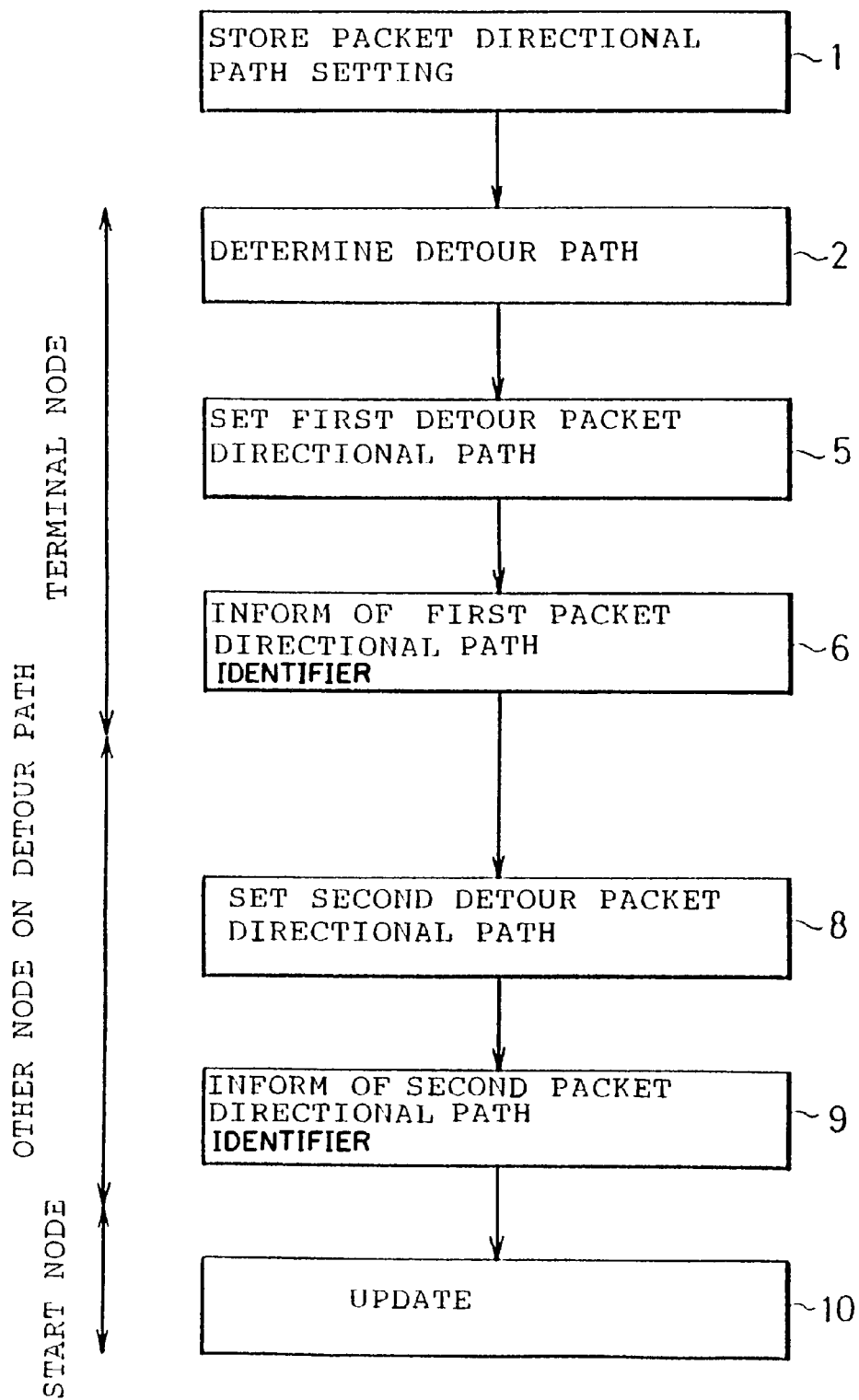
FIG. 1 is a block diagram illustrating the basic construction of the first aspect of the present invention.
Figure 2:
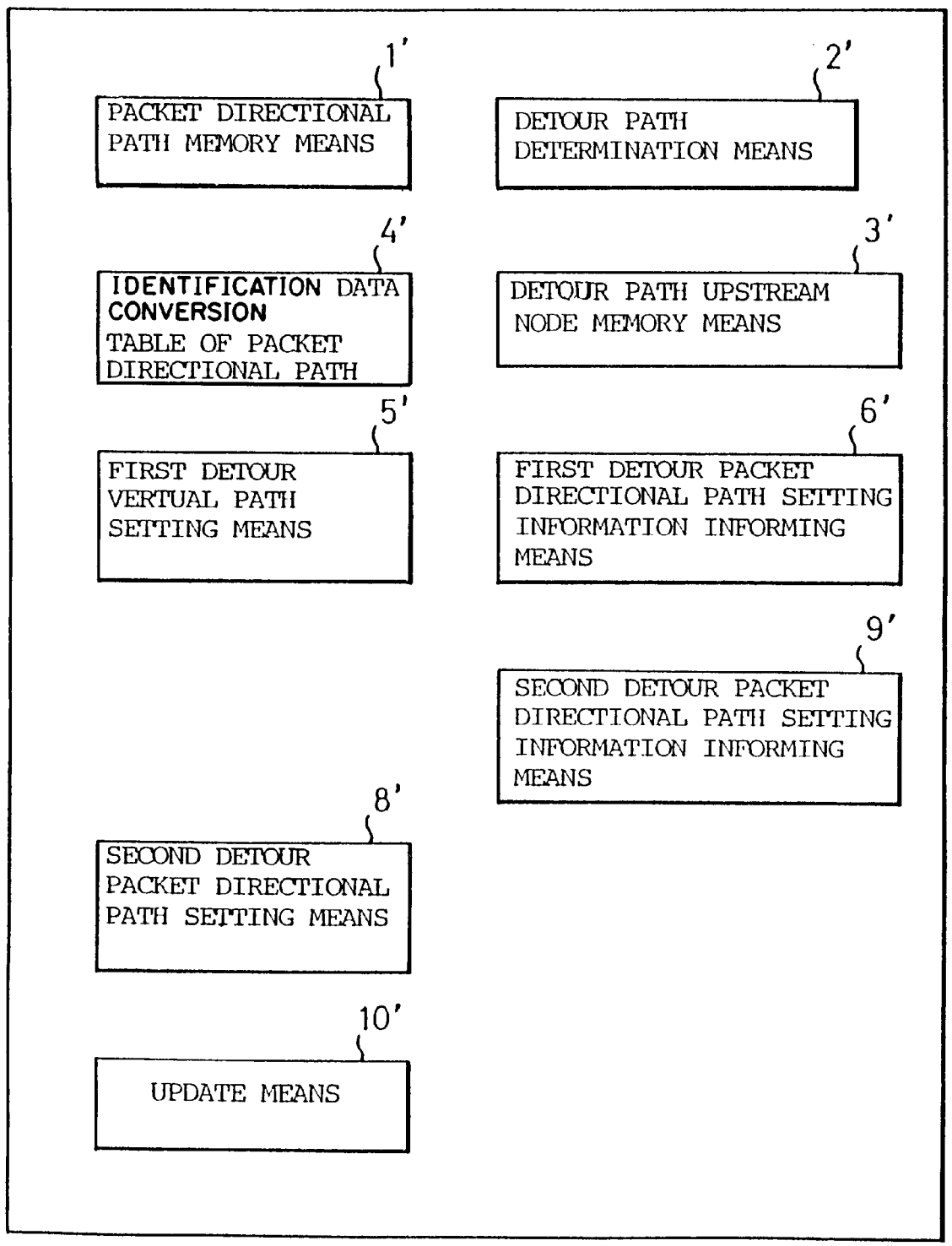
FIG. 2 is a block diagram illustrating the basic construction of the second aspect of the present invention.

Basic structure of First Embodiment of Present Invention (FIGS. 1 and 2)

FIG. 1 shows the basic sequence of a detour path determination method as the first aspect of the present invention. The high speed packet communication network to which the detour path determination method of the present invention is applied has a construction which includes a plurality of nodes, and wherein nodes adjacent to one another among these nodes are linked, and each of these nodes has an identification data conversion table 4 of packet directional path(s) for storing an identifier(s) of a packet directional path(s) which is in use and an identifier(s) of a packet directional path(s) which is out of use, for links between the node itself and the nodes adjacent thereto. In the high speed packet communication network described above, the detour path determination method according to the present invention determines an identifier(s) of a packet directional path (s) for a detour path which detours one of the nodes of a preset packet directional path(s).

In the packet directional path memory step 1, information on an identifier(s) of a packet directional path(s) used in a link extending from a first upstream node one node upstream of a given node among each of a plurality of nodes on each of preset packet directional path(s) passing through the given node to the given node, an identifier(s) of a packet directional path(s) used in a link connecting a second node upstream two nodes upstream of the given node to the first node upstream of the given node, and information on these two upstream nodes, are stored in advance for each of a plurality of nodes.

First, in the detour path determination step 2, a detour path which starts from the first node upstream of the given node and ends up with the first downstream node one node downstream of the given node and which detour path detours the given node, is determined on the preset packet directional path(s). In this step 2, nodes other than the start node on the detour path store information on nodes one node upstream thereof on the detour path, respectively.

In the first detour packet directional path setting step 5, the terminal node described above sets afresh the same number of identifier(s) as the number of identifier(s) of the packet directional path(s) used in the link extending from the second node upstream of the terminal node to the first node upstream of the terminal node on the preset packet directional path(s) described above, among the identifier(s) of the packet directional path(s) of the link extending from the first node upstream of the terminal node to the terminal node in the detour path, which packet directional path is out of use, in accordance with the determination of the detour path described above, in order to use the identifier(s) for the detour path. Then, the terminal node updates the identification data conversion table 4.

In the first packet directional path setting data informing step 6, the terminal node informs to the node one node upstream thereof in the detour path, the identifier(s) of the packet directional path(s) set afresh in the first detour packet directional path setting step 5 described above, and information on the identifier(s) of the preset packet directional path(s), which corresponds to the newly set identifier(s) of the packet directional path(s), which is stored in the pass memory means 1 and which has been used in the link extending from the second node upstream thereof to the first node upstream thereof in the preset packet directional path (s).

In the second detour packet directional path setting step 8, each of the nodes other than the terminal node and the start node in the detour path described above receives from a node downstream of the above each node in the detour path, the identifier(s) of the packet directional path(s) set afresh at the node one node downstream of the above each node in the link extending from each node itself to the node downstream thereof in the detour path, and information on the identifier(s) of the original packet directional path(s) which corresponds to the identifier(s) set afresh at the node downstream of the above each node in the detour path, and which has been used in the link extending from the second upstream node to the first upstream node upstream of each node on the original packet directional path. Then, the above each node sets afresh the same number of identifier(s) as the number of the identifier(s) of the packet directional path(s) set afresh at the node one node downstream of the above each node in the link extending from each node itself to the node downstream thereof in the detour path, among the identifier(s) of the packet directional path(s) of the link extending from a node one node upstream of the above each node itself to each node itself on the detour path, in response to the identifier(s) of the packet directional path(s) set afresh at the node one node downstream of the above each node in the link extending from each node itself to the node downstream thereof in the detour path, in order to use them in the detour path, and updates the packet directional path identification data conversion table 4.

In a second packet directional path setting data informing step 9, each of the nodes other than the terminal node and the start node in the detour path informs, to the node one node upstream thereof in the detour path, the identifier(s) set afresh by the second detour packet directional path setting means 7 described above and information on the identifier(s) of the preset packet directional path(s) which has been used in the link extending from the second node upstream thereof to the first node upstream thereof in the preset packet directional path(s).

In an updating step 10, the start node in the detour path determined as described above receives, from a node downstream of the start node in the detour path, the identifier(s) of the packet directional path(s) set afresh at the node downstream of the start node in the link extending from the start node to the node one node downstream thereof, and information on the identifier(s) which corresponds to the identifier(s) of the newly set packet directional path(s), and which has been used in the link extending from the second node upstream of the terminal node to the first node immediately thereof in the original packet directional path(s), and updates the identification data conversion table 4 of the packet directional paths of the start node in accordance with the identifier(s) of the newly set packet directional path(s) on the basis of the information on the identifier(s) of the original packet directional path(s).

In the detour path determination method according to the first aspect of the present invention, each of a plurality of nodes is allowed to store the identifier(s) of the packet directional path(s) used in the link extending from the node one node upstream thereof to itself on the preset packet directional path(s) for each of the preset packet directional path(s) passing through each node, information on the identifier(s) of the packet directional path(s) used in the link extending from the second node upstream thereof to the first node upstream thereof and these two upstream nodes, in the packet directional path memory step 1. In the next detour path determination step 2, the detour path extending from a node upstream of a given node on the preset packet directional path(s) as the start point to a node downstream of the given node as the terminal point, and detouring the given node, is determined. Due to the packet directional path memory step 1 described above, the terminal node stores the start node. In this step, the node(s) other than the start node on the detour path stores the node one node upstream thereof on the detour path. The start node can be reached by tracing upstream one node by one node from the terminal node in the reverse direction on the basis of the above storage.

In the first detour packet directional path setting step 5, the terminal node sets afresh the same number of identifier(s) as the number of the identifier(s) of the packet directional path(s) used in the link extending from the second node upstream thereof to the first node upstream thereof on the preset packet directional path(s), which are stored in the packet directional path memory step 1 described above, among the identifier(s) of the non-used packet directional path(s) in the link extending from the node upstream thereof to itself in the detour path, to use the new identifier(s) for the detour path, and updates the identification data table 4 of the packet directional path. In this way, the identifier(s) of the packet directional path(s) of the detour path is set on the terminal node side in the link extending from the node one node upstream thereof to the terminal node in the detour path described above.

In the first packet directional path setting data informing step 6, the terminal node informs, to the node one node upstream thereof in the detour path, the identifier(s) of the packet directional path(s) set afresh in the first detour packet directional path setting step 5 and the information on the identifier(s) of the preset packet directional path(s), which corresponds to the packet directional path set afresh, which is stored in the pass memory means 1, and which has been used in the link extending from the second node upstream thereof to the first node upstream thereof in the preset packet directional path(s) to be detoured by the detour path. In other words, in this step, the identifier(s) of the packet directional path(s) of the link extending from the node one node upstream thereof to itself in the detour path set on the terminal node side is allowed to correspond to the identifier(s) of the original packet directional path(s) of the start point, and is informed to the node one node upstream thereof in the detour path.

Thereafter, the second detour packet directional path setting step 8 and the second packet directional path setting data informing step 9 are repeated at each of the nodes on the detour path other than the start node and the terminal node described above, so that setting of the identifier(s) of the packet directional path(s) in each of the links between the nodes at the nodes on the downstream side of the respective links (with correspondence to the identifier(s) of the packet directional path(s) in the outgoing link of the original packet directional path(s) at the start node described above), information to the preset upstream nodes (with correspondence to the identifier(s) of the packet directional path(s) of the outgoing link of the original packet directional path(s) at the start node described above), and updating of the identification data table of the packet directional paths at the upstream nodes according to the above setting at the downstream nodes are effected in the direction from the terminal node to the start node.

The above information reaches the start node by passing upstream through the detour path as described above. Updating of the identification data table 4 of the packet directional path at the start node is carried out in the updating step 10, and setting of the identifier(s) of the packet directional path(s) in this detour path is thus completed.

In addition to the basic procedure of the first aspect of the present invention described above, each bit address in the first packet directional path setting data informing step 6 may have a bit map conversion sub-step 11 for converting the information on the identifier(s) of the packet directional path(s), which has been used in the link extending from the second upstream node to the first upstream node in the original packet directional path, to bit map data corresponding to the identifier(s) of the packet directional path(s), and the identifier(s) of this packet directional path(s) can be delivered to upstream nodes in the form of the converted bit map data in both of the first and second packet directional path setting data informing steps 6 and 8.

Due to the bit map conversion sub-step 11 described above, the information on the identifier(s) of the packet directional path(s), which has been used in the link extending from the second upstream node to the first upstream node in the original packet directional path(s), is delivered to the upstream nodes in the form of the converted bit map data in both of the first and second packet directional path setting data informing steps 6 and 8. Generally, the number of the identifier(s) of the packet directional path(s) set to the detour path is extremely great, but the bit map conversion described above can prevent the data quantity at the time of informing of the information on the identifier(s) of the original packet directional path(s) from becoming so great.

Alternatively, when the identifiers described above can be put in a sequence order, in the above basic procedure of the first aspect of the present invention, the embodiment may further include:

a leading identification data detection sub-step 12 for detecting a leading value of the information on the identifier(s) of the packet directional path(s), which has been used in the link extending from the second upstream node to the first upstream node in the original packet directional path(s), in the first packet directional path setting data informing step 6;

a final identification data detection sub-step 13 for detecting the final value among the information on the identifier(s) of the preset packet directional path(s); and a bit map conversion sub-step 14 for converting the information on the identifier(s) of the preset packet directional path(s) at least within the range from the leading value to the final value to bit map data in which each bit of the bit map data indicates an identifier of a packet directional path;

wherein the information on the identifier(s) of the packet directional path(s) can be outputted as the leading value, the final value, and data between the leading value and the final value among the bit map data, in the first and second packet directional path setting data informing steps 6 and 8.

According to the above leading identification data detection sub-step 12, the final identification data detection sub-step 13 and the bit map conversion sub-step 14 described above, the bit map data needs only inform the data between the leading value and the final value of the information on the identifier(s) of the packet directional path(s), and in this way, the data quantity at the time of informing the data of the identifier(s) of the original packet directional path(s) can further be reduced.

Furthermore, in the first packet directional path setting data informing step 6 described above, the leading value of the identifier(s) of the packet directional path(s) set afresh in the first detour packet directional path setting step 5 and the number of the identifier(s) of the packet directional path(s), may be informed to the first upstream node.

Basic Structure of Second Aspect of Present Invention (FIG. 2)

FIG. 2 shows the basic construction of the identification data determination system of the packet directional path of the detour path according to the second aspect of the present invention.

The high speed packet communication network to which the identification data determination system of the packet directional path of the detour path according to the present invention is applied includes a plurality of nodes, adjacent ones of which are linked with one another, wherein each of these nodes has an identification data conversion table 4' of packet directional path(s) for storing an identifier(s) of a packet directional path(s) which is in use and an identifier(s) of a packet directional path(s) which is out of use.

In the high speed packet communication network described above, the detour path determination system of the present invention determines the identifier(s) of the packet directional path(s) of a detour path detouring one node of a preset packet directional path(s).

According to the present invention, each of a plurality of nodes includes:

packet directional path memory means 1' for storing an identifier(s) of a packet directional path(s) used in a link extending from a first upstream node one node upstream of the above each node to each node itself on the preset packet directional path(s) for each of the preset packet directional path(s) passing through the above each node, information on an identifier(s) of a packet directional path(s) used in a link extending from a second upstream node to the above first upstream node, and the first and second upstream nodes;

detour path determination means 2' for determining a detour path detouring the first upstream node one node upstream of the above each node in each of the preset packet directional path(s) setting the second upstream node on the preset packet directional path(s) as a start and each node itself as a terminal node, for each of packet directional path(s) passing through each node itself; and detour path upstream node memory means 3' for storing a third upstream node one node upstream of each node in a detour path passing through each node itself and using a node other than each node as a terminal node;

first detour packet directional path setting means 5' for setting afresh the same number of an identifier(s) of a packet directional path(s) as the number of the identifier(s) of the packet directional path(s) used in the link extending from the second upstream node to the first upstream node upstream of each node on the preset packet directional path(s) among the identifier(s) of the non-used packet directional path(s) of a link extending from a fourth upstream node one node upstream of each node to each node itself on the detour path in accordance with the determination of the detour path when each node itself is the terminal node of the determined detour path, to use the newly set identifier(s) for the detour path, and for updating the identification data conversion table 4' in each node;

first packet directional path identification data informing means 6' for informing to the fourth upstream node on the detour path, when each node itself is the terminal node of the detour path determined, the identifier(s) of the packet directional path(s) set afresh by the first detour packet directional path setting means 5', and information on the identifier(s) of the packet directional path(s) used in the link extending from the second upstream node to the first upstream node on the preset packet directional path(s), where the link is to be detoured by the detour path, the information on the identifier(s) of the packet directional path(s) used in the link to be detoured corresponds to the identifier(s) of the packet directional path(s) set afresh in the first detour packet directional path setting means 5', and the information on the identifier(s) of the packet directional path(s) used in the link to be detoured is stored in the pass memory means 1;

second detour packet directional path setting means 8' for setting afresh corresponding to the identifier(s) of the packet directional path(s) set afresh at a first downstream node one node downstream of each node on the detour path, and to be used in the detour path, the same number of an identifier(s) of a packet directional path (s) as the number of the identifier(s) of the packet directional path(s) set afresh at the first downstream node, among the identifier(s) of the non-used packet directional path(s) of the link extending from the third upstream node to each node itself on the detour path, when each node is a node passed through by the determined detour path and when each node is informed from the first downstream node, of the identifier(s) of the packet directional path(s) set afresh at the first downstream node, and information on the identifier(s) of the packet directional path(s) used in the link extending from the second upstream node to the first upstream node on the preset packet directional path(s) and corresponding to the identifier(s) of the packet directional path(s) set afresh at the first downstream node, and the second detour packet directional path setting means 8' updating the identification data conversion table 4' of the packet directional path;

second packet directional path setting data informing means 9' for informing to the third upstream node upstream of each node itself on the detour path, the identifier(s) of the packet directional path(s) set afresh by the second detour packet directional path setting means 7' and information on the identifier(s) of the packet directional path(s) used in the link extending from the second upstream node to the first upstream node on the preset packet directional path(s), when each node is a node passed through by the determined detour path; and updating means 10' for updating the identification data conversion table 4' in each node itself by the identifier(s) of the packet directional path(s) set afresh at a second downstream node in a link extending from each node itself to the third downstream node one node downstream of each node on the detour path, on the basis of information on the identifier(s) of the packet directional path(s) used in the link extending from the second upstream node to the first upstream node on the preset packet directional path(s) and corresponding to the identifier(s) of the original packet directional path (s), when each node is the start node of the determined detour path and when each node is informed from a third downstream node one node downstream of each node, of the identifier(s) of the set-afresh packet directional path(s), and the information on the identifier(s) of the original packet directional path(s).

According to the packet directional path identification data determination system of the detour path of the second aspect of the present invention, each of a plurality of nodes has the pass memory means 1', so that the terminal node can recognize the second upstream node of the preset packet directional path(s), that is, the start node. The terminal node can also recognize the information on the identifier(s) of the packet directional path(s) in the outgoing link in the direction to the node detoured by the detour path described above, at this start node.

The detour path determination means 2', the detour path upstream node memory means 3', the first detour packet directional path setting means 5', the first packet directional path setting data informing means 6', the second detour packet directional path setting means 8', the second packet directional path setting data informing means 9', and the updating means 10', perform the operations in the corresponding steps in the first aspect of the present invention already described, respectively. In other words, the procedure of the first embodiment can be executed by the construction of the second embodiment.

In addition to the basic construction of the second aspect of the present invention, the first packet directional path setting data informing means 6' may have bit map conversion means 11' for converting the information on the identifier(s) of the packet directional path(s) used in a link extending from the second upstream node to the first upstream node upstream of the terminal node itself in the original packet directional path to bit map data in which each bit of the bit map data indicates an identifier of a packet directional path, and the identifier(s) of the packet directional path(s) is sent to nodes upstream thereof in the form of the converted bit map data by both of the first and second packet directional path setting data informing means 6' and 8'.

Alternatively, in addition to the basic construction of the second aspect of the present invention, the first packet directional path setting data informing means 6' may include:

leading identification,data detection means 12' for detecting a leading value among information on the identifier(s) of the packet directional path(s) used in the link extending from the second upstream node to the first upstream node upstream of each node in the original packet directional path;

final identification data detection means 13' for detecting a final value among information on the identifier(s) of the preset packet directional path(s); and bit map conversion map means 14' for allowing each bit address to convert information on the identifier(s) of the preset packet directional path(s) at least within the range of the leading value to the final value to a bit map data corresponding to the identifier(s) of the packet directional path(s);

the information on the identifier(s) of the packet directional path(s) is output from the first and second packet directional path identification data informing means 6' and 8' as data comprised of the leading value, the final value, and data between the leading value and the final value among the bit map data.

The bit map conversion means 11' or the leading identification data detection means 12', the final identification data detection means 13' and the bit map conversion means 14' for the conversion to the bit map data perform the operations of the respective sub-steps in the afore-mentioned first aspect of the present invention.

Furthermore, in the first packet directional path setting data informing means 6', the leading value of the identifier(s) of the packet directional path(s) set afresh to the first detour packet directional path setting means 5' and the number of the identifier(s) of the packet directional path(s) can be informed to the first upstream node of the detour path.

Embodiments (FIGS. 3 to 11)

Figure 3:
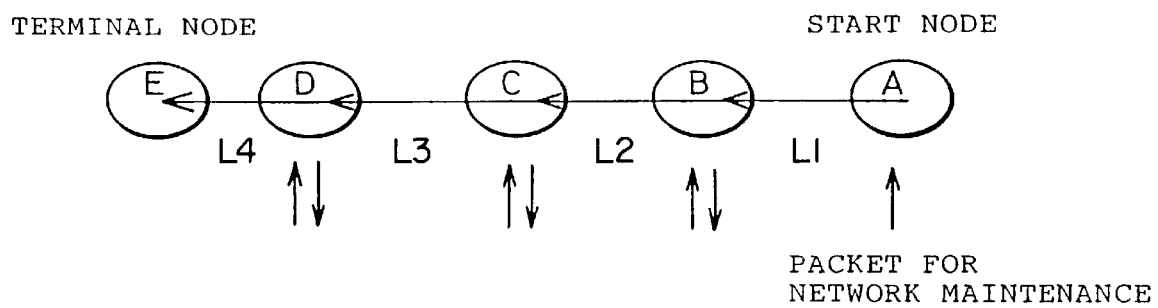
FIG. 3 is an explanatory diagram illustrating an example of a packet directional path memory step 1.

FIG. 3 is an explanatory diagram of an example of the packet directional path memory step 1 described above. As shown in FIG. 3, packet directional path(s) in a route extending from a node A to a node E through nodes B, C and D is considered. Here, as in the afore-mentioned packet directional path memory step 1, a maintenance packet containing data such as shown in FIG. 4 is transferred from the node A to the node B, from the node B to the node C, . . . from the node D to the node E, in order to store, in each of these nodes, the identifier(s) of the packet directional path(s) used in the link extending from the first upstream node to each node itself on the preset packet, the information on the identifier(s) of the packet directional path(s) used in the link extending from the second upstream node to the first upstream node, and these two upstream nodes, in the same way as in the aforementioned packet directional path memory step 1. In other words, the maintenance packet transferred from the node A to the node B includes the name of its own node, that is, "A", in the column of a first adjacent node, and the identifier "1001" of the packet directional path in the link 1 extending from the node A to the node B. Since the node A is the starting node, the column of a second adjacent node is left blank. Receiving this maintenance packet, the node B writes the content of the received column of the first adjacent node, that is, "A" and "1001" into the column of the second adjacent node, writes the name of its own node, that is, "B", and the identifier "0001" of the packet directional path extending from the node B to the node C, and sends the maintenance packet containing them to the link 2 extending to the node C. Receiving this maintenance packet, the node C writes as such the content of the received column of the first adjacent node, that is, "B" and "0001", into the column of the second adjacent node, writes the name of its own node, that is, "C", and the identifier "0101" of the packet directional path in the link 3 extending from the node C to the node D, and sends the maintenance packet containing them to the link 3. Furthermore, receiving this maintenance packet, the node D writes the content of the received column of the first adjacent node, that is, "C" and "0101", into the column of the second adjacent node, writes the name of its own node, that is, "D", and the identifier "0111" of the packet directional path in the link 4 extending from the node D to the node E, and sends the maintenance packet containing them to the link 4 extending to the link E. Here, the nodes B to E described above store the data contained by the maintenance packets which they receive, respectively. In this way, the packet directional path memory step 1 described above is accomplished.

Figure 5:
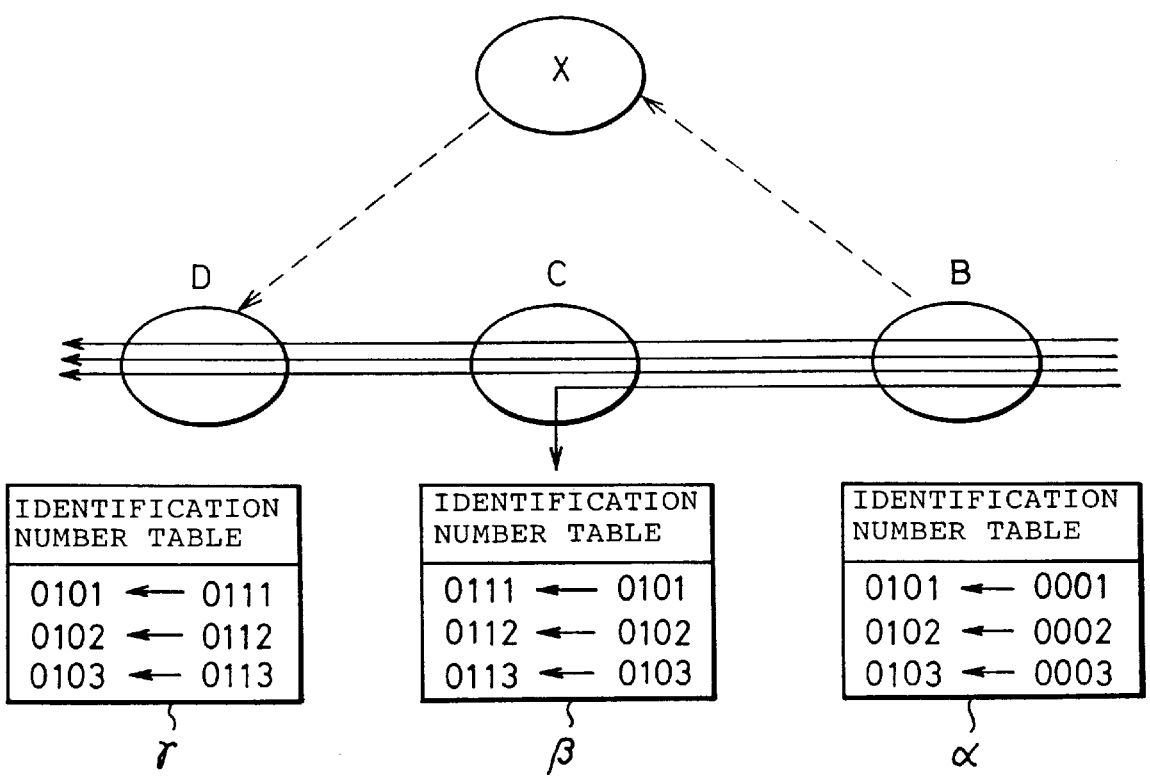
FIG. 5 is an explanatory diagram illustrating a packet directional path before detouring to illustrate an example of processing for determining an identifier(s) of a packet directional path(s) for a detour path according to the present invention.

Next, the packet directional path(s) set between the nodes B, C and D will be considered with reference to FIG. 5. In FIG. 5, symbol α denotes an identification data conversion table of the packet directional path at the node B, β denotes an identification data conversion table of the packet directional path at the node C, and γ denotes an identification data conversion table at the node D. In FIG. 5, only the identifier(s) of the packet directional path(s) explained as the object of detour are shown. As shown in the identification data conversion tables of these packet directional paths, the identifiers of the packet directional paths, i.e., "0101, 0102, 0103", are set to the link extending from the node B to the node C, and the identifier of the packet directional paths, i.e. "0111, 0112, 0113", are set to the link extending from the node C to the node D. Due to the function of the packet directional path memory means described above, the identifiers of the packet directional paths on the link extending from the node B to the node C, that is, "0101, 0102, 0103", are stored in the node D.

It will be assumed hereby that if any trouble occurs at the node C or in the link extending from the node C to the node D and is detected at the node D; then, the node D determines a detour path extending from the node B to the node D detouring the node C due to the afore-mentioned flooding. In the example shown in FIG. 5, the detour path ranging from the node B→node X→node C represented by a dash line is determined as the detour path.

Figure 6:
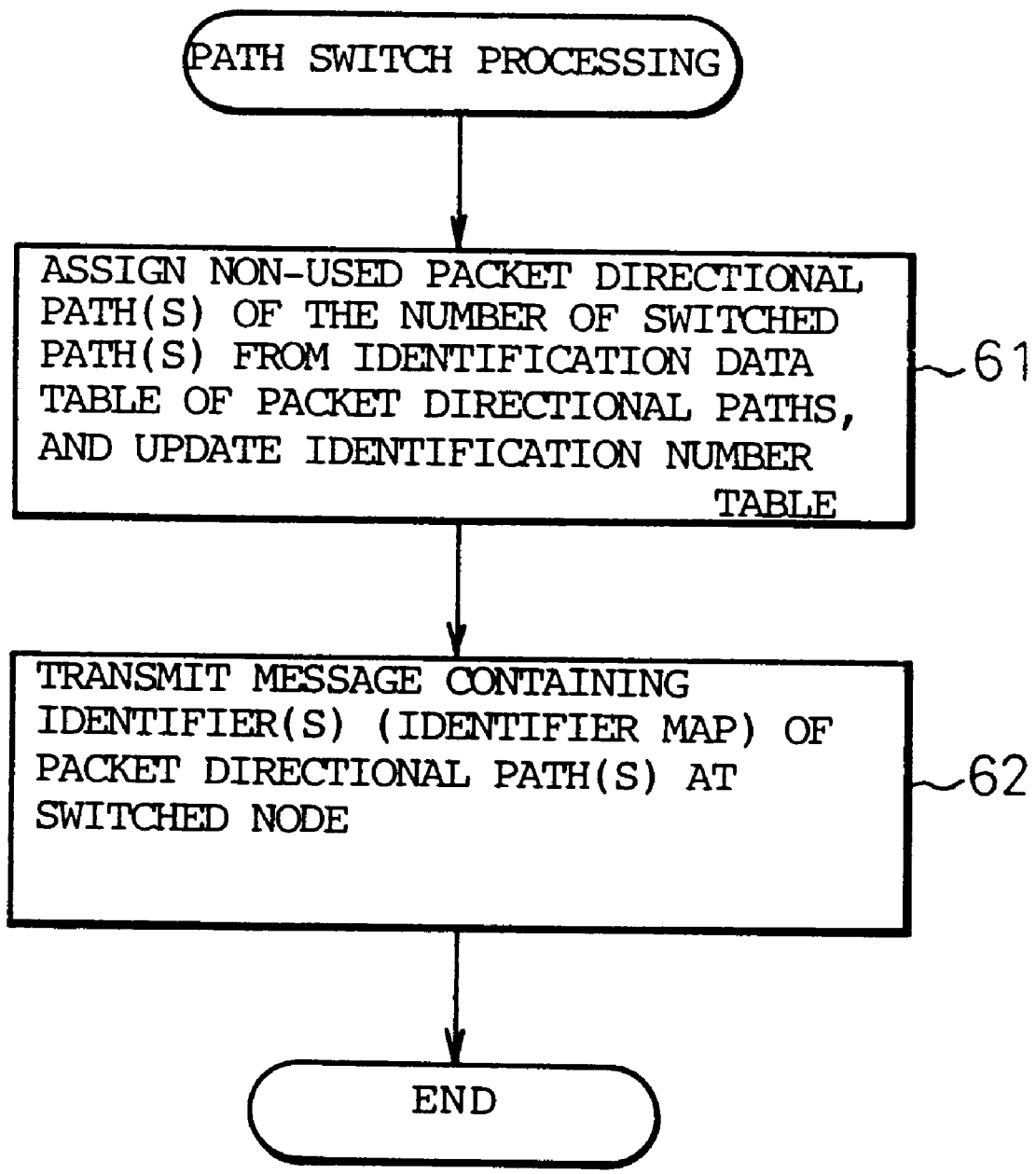
FIG. 6 is a flowchart of the sequence of processing at a terminal node for determining an identifier(s) of a packet directional path(s) for a detour path.
Figure 7:
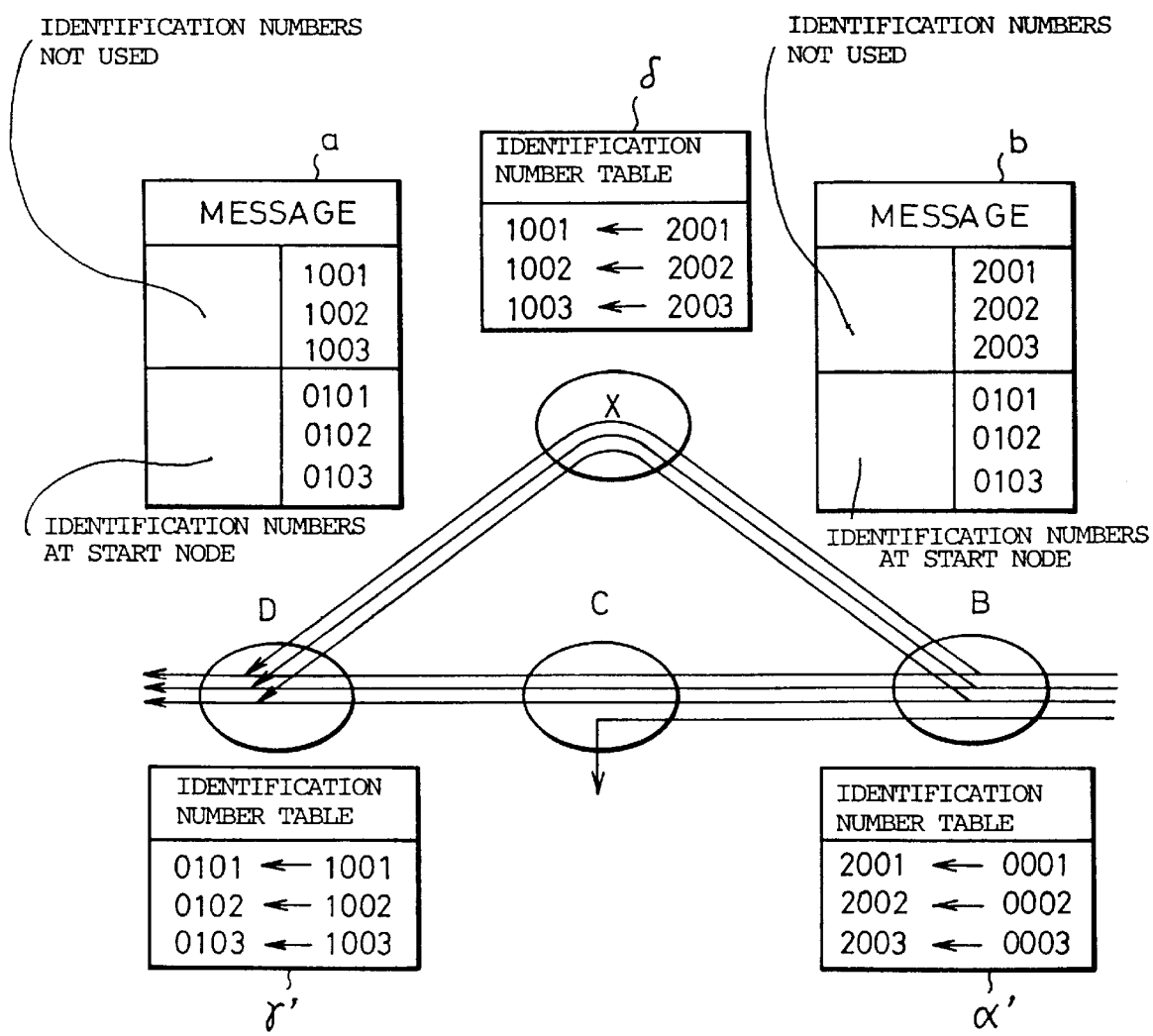
FIG. 7 is a diagram illustrating an example of processing for determining an identifier(s) of a packet directional path (s) for a detour path according to the present invention.

FIG. 6 shows the processing procedure for determining the identifier(s) of the packet directional path(s) of the detour path at the terminal node. The terminal node first determines the identifier(s) of the packet directional paths to be set afresh ("1001, 1002, 1003" in this example) of the identifiers, i.e., "0101, 0102, 0103", among the identifiers of the packet directional paths, which is out of use, in the link extending from the node X to the node D of the preset packet directional paths. The identifiers of the packet directional paths, which is out of use, in the link extending from the node X to the node D of the preset packet directional paths are stored in the identification data conversion table of the packet directional path at the node itself. The number of the identifiers set afresh in the link extending from the node X to the node D, that is, the number of the identifiers of the packet directional paths to be switched to the detour path (three in this example), is equal to the number of the identifiers of the preset packet directional paths in the link from the node B to the node C, where the number of the identifiers of the preset packet directional paths in the link from the node B to the node C, and the identifiers of the preset packet directional paths in the link from the node B to the node C are stored in the terminal node itself. The terminal node then updates the identification data conversion table of the packet directional path (step 61). Next, the identifiers of the packet directional paths of the link from the node X to node D, which are set afresh, are caused to correspond to the identifiers "0101, 0102, 0103" of the non-used packet directional paths of the link extending from the node X to the node D to be stored in the identification data conversion table of the packet directional path at the terminal node itself, and are then transmitted as the message to the node X through an overhead channel (step 62 in FIG. 6, and FIG. 7). In FIG. 7, the identification data conversion table of the packet directional path updated at the terminal node D at this time is represented by γ', and the message delivered from the terminal node is represented by symbol a.

Figure 8:
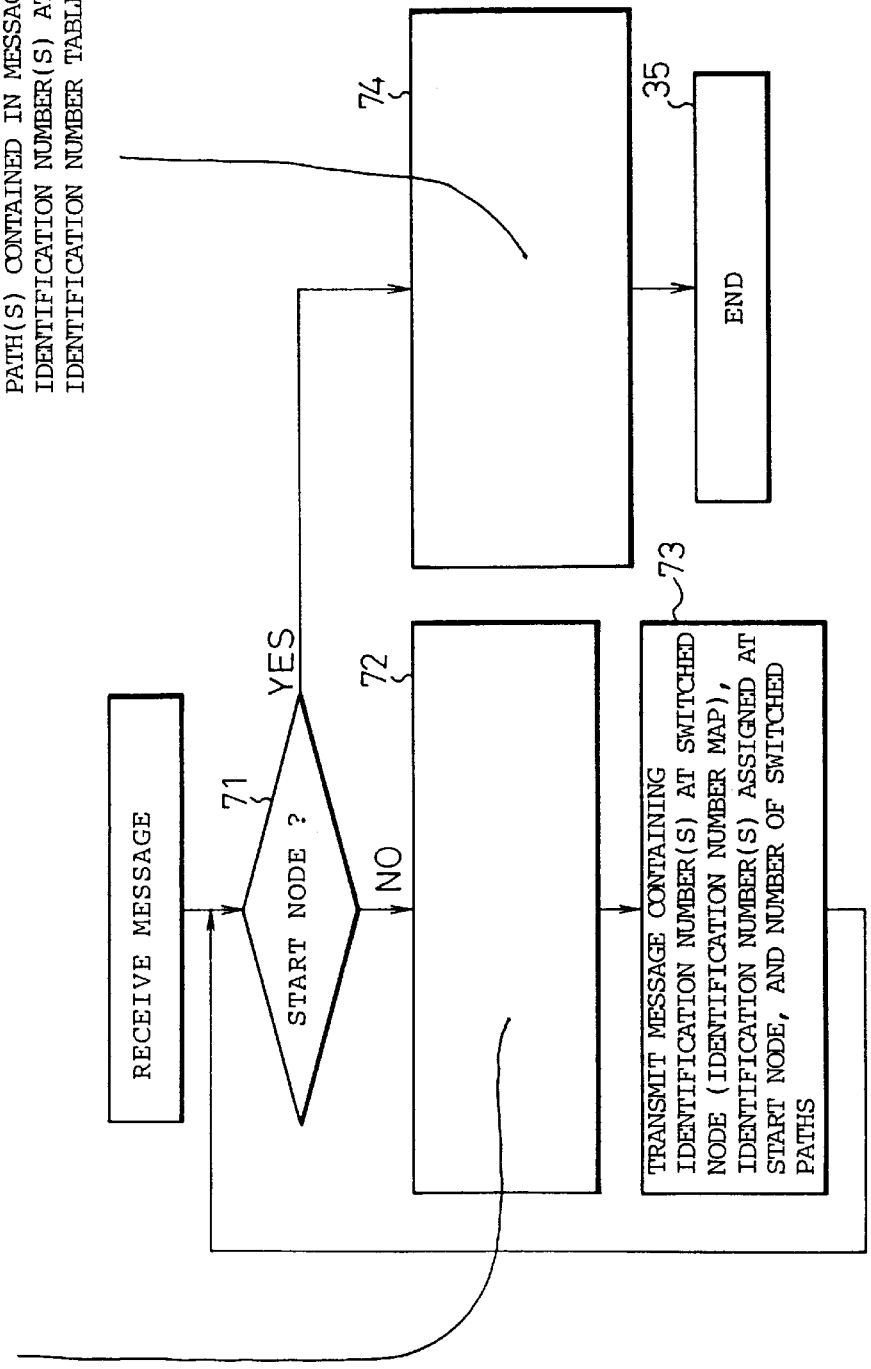
FIG. 8 is a flowchart showing the case where a node other than a terminal node on a detour path receives from a node one node downstream thereof, a message containing an identifier(s) of a packet directional path(s) in a link extending therefrom to the node downstream thereof, which is set anew at the downstream node, and information on identifier(s) of original packet directional path(s) which has been used in a link extending from a start node to a node to be detoured, and which corresponds to the identifier(s) of the newly set packet directional path(s)

FIG. 8 shows the processing procedure when a certain node other than the terminal node on the detour path described above receives from a node one node downstream of the above certain node, a message containing the first identifier(s) of the packet directional path(s) of a link extending from this certain node to the downstream node, which is set afresh at the downstream node, and the second information on the identifier(s) of the packet directional path(s) that has been used in the link from the second node upstream of the terminal node to the first upstream node in the original (preset) packet directional path(s) which corresponds to the first identifier(s) of the packet directional path(s) which is set afresh.

In FIG. 8, whether or not the certain node itself is the start node is determined at step 71. If the certain node is not the start node, the operation goes to step 72, where the identification data conversion table of the packet directional path is so set at the node itself corresponding to the first identifier(s) of the newly set packet directional path(s) contained in the received message. Next, the identifier(s) conversion table of the packet directional path(s) at the certain node itself is updated by setting afresh identifier(s) of the packet directional path(s) in the same number as the number of the first identifier(s) of the newly set packet directional path(s) contained in the received message, among the identifier(s) of the non-used packet directional path(s) extending from the first upstream node to the above certain node itself on the detour path with correspondence to the first identifier(s) of the above newly set packet directional path(s) contained in the received message. FIG. 7 shows the identification data conversion table of the updated packet directional path at the node X of the detour path. In the example shown in FIG. 7, the identifier(s) of the packet directional paths on the link extending from the node B to the node X are set to "2001, 2002, 2003" with correspondence to the first identifiers "1001, 1002, 1003" of the packet directional paths on the link extending from the node X to the node D.

At the next step 73, the message containing the identifier(s) of the packet directional path(s) set afresh at the node itself and the information on the second identifier(s) of the packet directional path(s) which has been used in the link extending from the second upstream node upstream of the terminal node to the first upstream node of the terminal node is informed to the first upstream node upstream of the node itself on the detour path. In FIG. 7, an example of this message sent from the node X is represented by symbol b.

If the above certain node itself is the start node in step 71, the operation goes to step 74, where a corresponding portion of the identification data conversion table of the packet directional path at the node itself is updated on the basis of the second information on the packet directional path(s) which has been used in the link from the second upstream node to the first upstream node of the start node in the preset packet directional path(s), which is contained in the received message. The identification data conversion table of this packet directional path is set corresponding to the identifier(s) of the newly set packet directional path(s). In FIG. 7, the identification data conversion table of the packet directional path at the node B is updated from α of FIG. 5 to α' of FIG. 7. In other words, the identifiers of the packet directional paths of the outgoing link corresponding to the identifiers "0001, 0002, 0003" of the incoming link of the node X in FIGS. 5 and 7 are updated from the second identifiers "0101, 0102, 0103" of the packet directional paths of the link from the node B to node C to the identifiers "2001, 2002, 2003" of the packet directional paths in the link of the node B to the node X.

The data contained by the message described above can be compressed as will be explained with reference to FIGS. 9 and 10.

Figure 9:
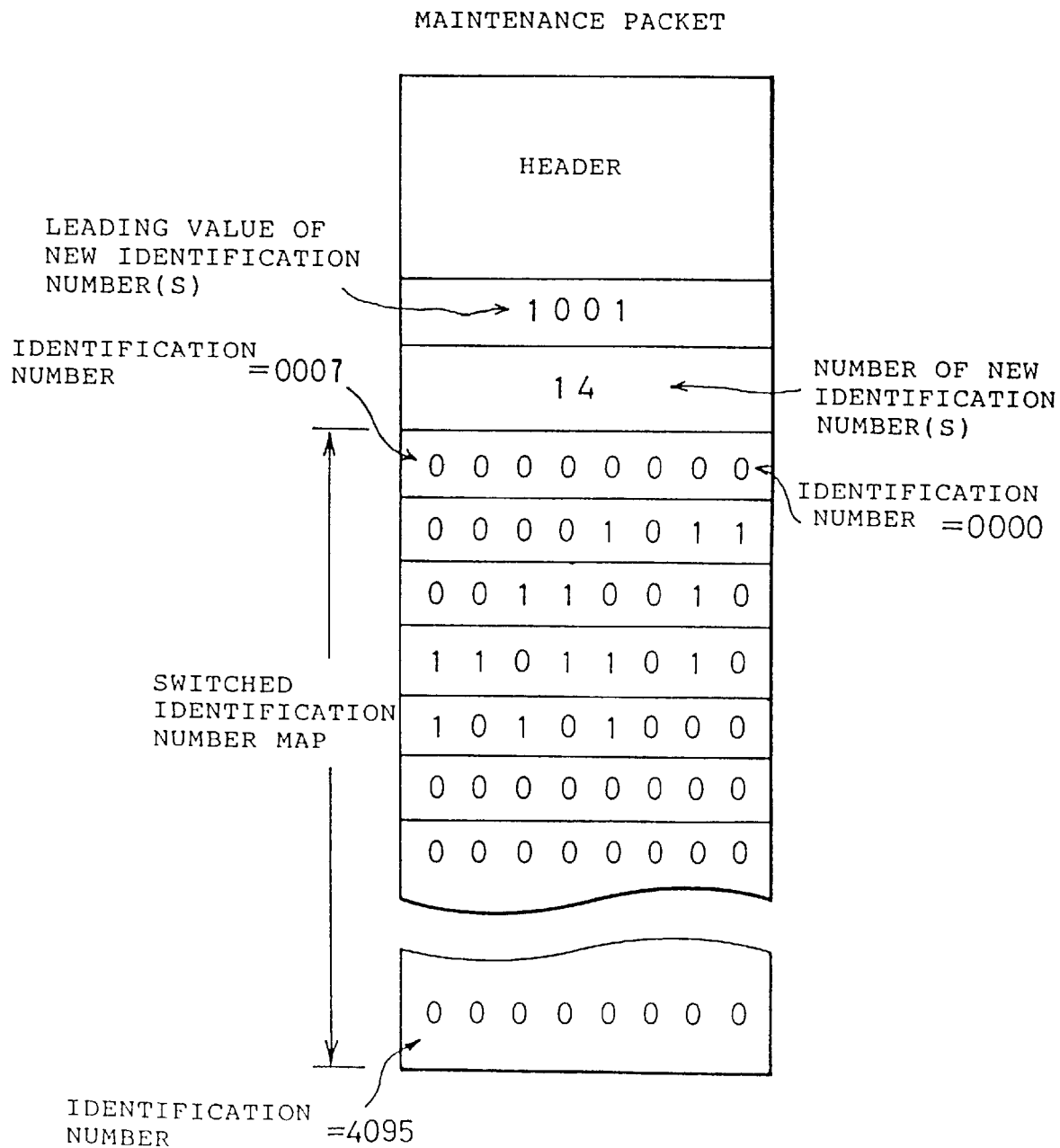
FIG. 9 is an explanatory diagram illustrating an example of a format of a data area of a maintenance packet containing a message to be transmitted upstream from one node to another node on a detour path extending from the terminal node to the start node.

FIG. 9 shows an example of the format of a data area of the maintenance packet containing the message which is transmitted upstream one node by one node through the nodes of the detour path from the terminal node to the start node described above. The maintenance packet shown in FIG. 9 contains the minimum value of the first identifier(s) of the packet directional path(s) of the link extending from a node upstream of a node sending the maintenance packet to the node sending the maintenance packet, the number of the first identifier(s) of the packet directional path(s), and the bit map data obtained by converting the second information on the identifiers of the packet directional paths to bit map data, where the first identifier(s) of the packet directional path(s) is set afresh at the node sending the maintenance packet, and the second identifier(s) of the packet directional path(s) is set in the link extending from the second upstream node to the second upstream node upstream of the terminal node in the preset packet directional path(s), and in the bit map data, values of the second information on the identifier(s) of the packet directional path(s) is indicated by each bit address. When sending the identifier(s) of the packet directional path(s) extending from the first upstream node of the above node sending the maintenance packet to the node itself on the detour path set afresh in the form of the data of the minimum value and the set number, each node on the detour path employs the identifiers of the non-used packet directional paths having values of successive numbers beginning from the minimum number, other than the values of the identifier(s) of the in-use packet directional path(s) in the identification data conversion table of the packet directional path of the above node itself. When each node in the detour path receives this data, each node can recognize the first identifier(s) based on the minimum number.

Figure 10:
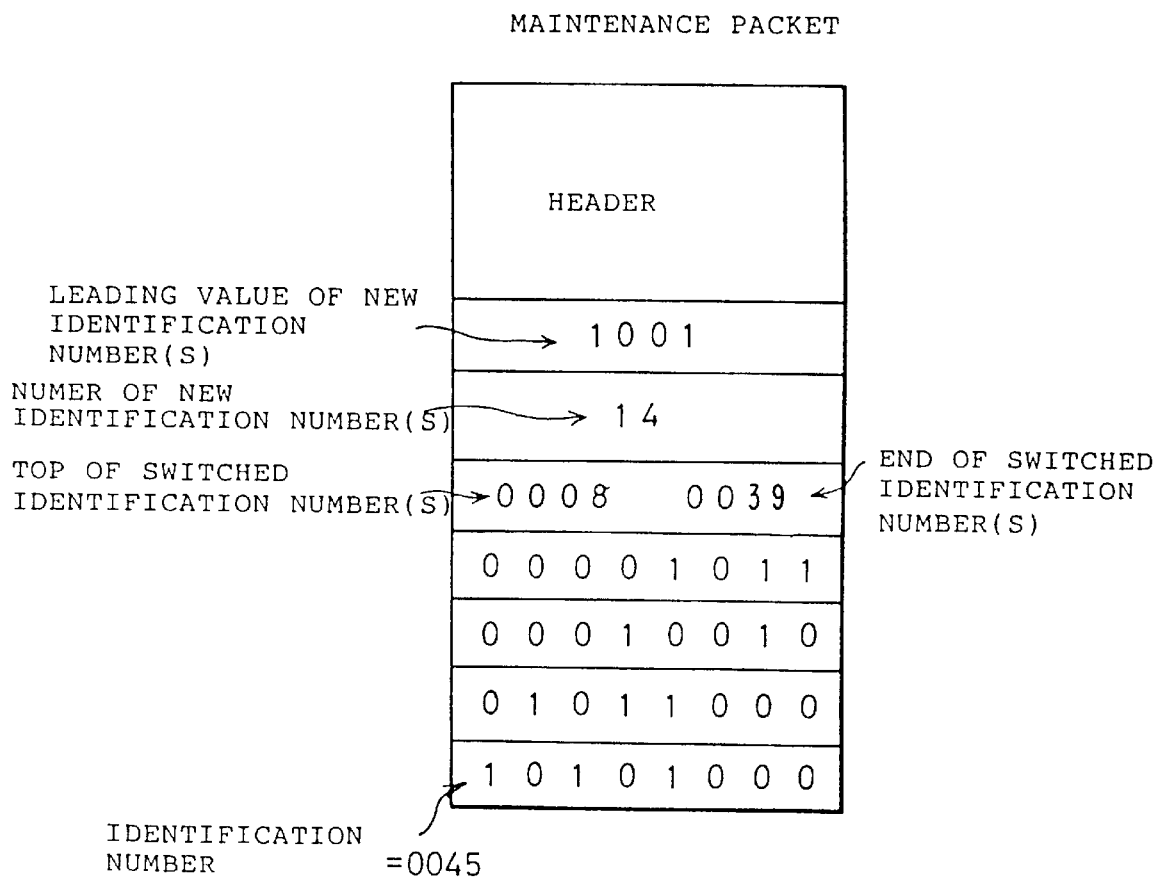
FIG. 10 is an explanatory diagram illustrating an example of a format of a data area of a maintenance packet containing a message to be transmitted upstream from one node to another node on a detour path extending from the terminal node to the start node.

FIG. 10 shows another example of the format of the data area of the maintenance packet containing a message transmitted upstream one node by one node through the nodes of the detour path from the terminal node to the start node described above. The maintenance packet shown in FIG. 10 contains the minimum value of the first identifier(s) of the packet directional path(s) extending from a first upstream node upstream of a node transmitting the maintenance packet to the node transmitting the maintenance packet on the detour path set afresh at the node for sending this maintenance packet, the number of the identifier(s) of the packet directional path(s), the minimum and maximum values of the second information on the identifiers of the packet directional paths set in the link extending from the second upstream node of the terminal node to the first upstream node of the terminal node, and the portion between the minimum and maximum values of bit map data obtained by converting the second information on the identifier(s) of the packets directional path(s) to the bit map data, where values of the second identifier(s) are indicated by each bit address.

FIG. 11 shows the outline of the construction of a cross-connection apparatus as the node apparatus in the embodiment of the present invention. In FIG. 11, reference numeral 31 denotes a controller, 32 denotes a reception interface, 33 denotes an identification data conversion portion of a packet directional path, 34 denotes a switch portion, and 36 denotes a transmission interface.

A plurality of reception interfaces 32 are arranged corresponding to the incoming links from other nodes, respectively, and a packet of high speed packet communication received at each reception interface is subjected to identification data conversion at the identification data conversion portion 33 for the corresponding packet directional path. The route of this packet is switched to the route to the transmission interface 36 by the switch portion 34 in accordance with the identifier(s) of the packet directional path(s) in each packet, and is sent to the outgoing link corresponding to each transmission interface 36. Each of these portions is controlled by the controller 31. As a known technique, each reception interface 32 has the function of detecting trouble on the incoming link side, and the detected trouble is informed to the controller 31. The controller 31 executes the control operation according to the present invention in accordance with this report of trouble. The delivery of the message between the nodes for the control described above is carried out in the controller 31 of each node apparatus by generating the maintenance packet containing the destination address in the header thereof and inserting the maintenance packet into the reception interface 32 in the same way as the conventional maintenance packet. The reception of the maintenance packet addressed to the node itself by the controller 31 is carried out by sorting the maintenance packet at the transmission interface 36.

As described above, the detour path determination method and the determination system according to the present invention can set the identifier(s) of the packet directional path(s) in each link of the detour path while keeping the correspondence relation to the identifier(s) of the packet directional path(s) which has been set to the outgoing link of the start node of the original packet directional path.

What is claimed is:

1. A method for determining, in a packet communication network, at least one first identifier identifying at least one first packet directional path, which is to be logically defined in each of a plurality of links in a bypassing path, where said bypassing path bypasses a faulty signal path extending from a first node through a second node to a third node, said bypassing path extends from said first node through at least one midway node to said third node, and said at least one first packet directional path is to be determined corresponding to at least one second packet directional path which is logically defined in each of a plurality of links in the faulty signal path;

the packet communication network contains a plurality of nodes, and each of the plurality of nodes contains unused identifier storing means for storing, in said each of the plurality of nodes, information on at least one unused identifier each being available for use in identifying a packet directional path in each link incoming to the said each of the plurality of nodes; and said third node contains original identifier storing means for storing, in said third node, at least one second identifier identifying said at least one second packet directional path in the link between the first node and the second node;

said method comprising the steps of:

(a) determining, in said third node, as said at least one first identifier identifying said at least one first packet directional path in the link between the third node and a first one of the at least one midway node located one node upstream of the third node on the bypassing path, at least one unused identifier among the at least one unused identifier stored in the third node by the unused identifier storing means, so that each of the at least one second identifier corresponds to one of the at least one first identifier determined in the link between the third node and the first one of the at least one midway node on the bypassing path;

(b) transferring, from the third node to the first one of the at least one midway node, said at least one second identifier and the at least one first identifier determined in the link between the third node and the first one of the at least one midway node, so that the correspondence between each of the at least one first identifier and one of the at least one second identifier, is recognizable;

(c) receiving, at each of the at least one midway node on the bypassing path, from one of the third node and a second one of the at least one midway node which is located one node downstream of said each midway node, said at least one second identifier and said at least one first identifier determined in the link between said each midway node and said one of the third node and the second one of the at least one midway node, and recognizing the correspondence between each of the at least one second identifier and one of the at least one first identifier determined in the link between said each midway node and said one of the third node and the second one of the at least one midway node;

(d) determining, after step (c), in said each midway node, as said at least one first identifier identifying said at least one first packet directional path in a link between said each midway node and one of the first node and a third one of the at least one midway node which is located one node upstream of said each midway node on the bypassing path, at least one unused identifier among the at least one unused identifier stored in said each midway node by the unused identifier storing means, so that each of the at least one first identifier determined in the link between said each midway node and said one of the first node and the third one of the at least one midway node on the bypassing path;

(e) transferring, from said each midway node to said one of the first node and the third one of the at least one midway node, said at least one second identifier and said at least one first identifier determined in the link between said each midway node and said one of the first node and the third one of the at least one midway node, so that the correspondence between each of the at least one second identifier and one of the at least one first identifier determined in the link between said each midway node and said one of the first node and the third one of the at least one midway node, is recognizable; and (f) receiving, at the first node, from a fourth one of the at least one midway node located one node downstream of the first node one the bypassing path, said at least one second identifier and the at least one first identifier determined in the link between the first node and said the fourth one of the at least one midway node, and recognizing the correspondence between each of the at least one second identifier and one of the at least one first identifier determined in the link between the first node and said the fourth one of the at least one midway node.

2. A method according to claim 1, wherein at least one of said steps (b) and (e) include a bit map conversion sub-step for converting, before transferring said at least one second identifier, said at least one second identifier into bit map data each bit of which corresponds to a possible value of one of the at least one second identifier, and each bit corresponding to the value of one of the at least one second identifier is valid.

3. A method according to claim 1, wherein at least one of said steps (b) and (e) include, before transferring said at least one first identifier and the at least one second identifier, a leading identification data detection sub-step for detecting a leading value of said at least one second identifier;
a final identification data detection sub-step for detecting a final value of said at least one second identifier; and
a bit map conversion sub-step for converting, before transferring said at least one second identifier, the at least one second identifier into bit map data, where the it map data begins with a bit corresponding to the leading value of the at least one second identifier, and ends with a bit corresponding to the final value of the at least one second identifier, each bit of the bit map data corresponds to a possible value, between the leading and final values, of the at least one second identifier, and each bit corresponding to the value of one of the at least one second identifier is valid.

4. A method according to claim 1, wherein at least one of said steps (b) and (e), the leading value of the at least one first identifier determined in the link between the third node and the first one of the at least one midway node, and the number of the at least one first identifier determined in the link between the third node and the first one of the at least one midway node, are transferred instead of the at least one first identifier.

5. A system for determining, in a packet communication network, at least one first identifier identifying at least one first packet directional path, which is to be logically defined in each of a plurality of links in a bypassing path, where said bypassing path bypasses a faulty signal path extending from a first node through a second node to a third node, said bypassing path extends from said first node through at least one midway node to said third node, and said at least one first packet directional path is to be determined corresponding to at least one second packet directional path which is logically defined in each of a plurality of links in the faulty signal path;

the packet communication network contains a plurality of nodes, and each of the plurality of nodes comprises unused identifier storing means for storing information on at least one unused identifier each being available for use in identifying a packet directional path in each link incoming to the said each of the plurality of nodes; and said third node comprises:
original identifier storing means for storing at least one second identifier identifying said at least one second packet directional path in the link between the first node and the second node;
first determining means for determining, as said at least one first identifier identifying said at least one first packet directional path in the link between the third node and a first one of said at least one midway node located one node upstream of the third node on the bypassing path, at least one unused identifier among the at least one unused identifier stored in the third node by the unused identifier storing means, so that each of the at least one first identifier determined in the link between the third node and said first one of said at least one midway node on the bypassing path; and
first transferring means for transferring, to the first one of said at least one midway node, said at least one second identifier and the at least one first identifier determined in the link between the third node and the first one of said at least one midway node, so that the correspondence between each of the at least one first identifier and one of the at least one second identifier, is recognizable,
each of said at least one midway node on the bypassing path comprises:
first receiving means for receiving from one of the third node and second one of the at least one midway node, said at least one second identifier and said at least one first identifier determined in the link between said each midway node and said one of the third node and the second one of the at least one midway node, and recognizing the correspondence between each of the at least one second identifier and one of the at least one first identifier determined in the link between said each midway node and said one of the third node and the second one of the at least one midway node;
second determining means for determining as said at least one first identifier identifying said at least one first packet directional path in a link between said each midway node and one of the first node and a third one of the at least one midway node which is located one node upstream of said each midway node on the bypassing path, at least one unused identifier among the at least one unused identifier stored in said each midway node by the unused identifier storing means; and
second transferring means for transferring, from said each midway node to said one of the first node and the third one of the at least one midway node, said at least one second identifier and said at least one first identifier determined in the link between said each midway node and said one of the first node and the third one of the at least one midway node, so that the correspondence between each of the at least one second identifier and one of the at least one first identifier determined in the link between said each midway node and said one of the first node and the third one of the at least one midway node, is recognizable,
said first node comprises:
second receiving means for receiving from a fourth one of the at least one midway node located one node downstream of the first node on the bypassing path, said at least one second identifier and the at least one first identifier determined in the link between the first node and said the fourth one of the at least one midway node, and recognizing the correspondence between each of the at least one second identifier and one of the at least one first identifier determined in the link between the first node and said the fourth one of the at least one midway node.

6. A system according to claim 5, wherein said first transferring means includes a bit map conversion means for converting, before transferring said at least one second identifier, said at least one second identifier into bit map data each bit of which corresponds to a value of the at least one second identifier, and each bit corresponding to the value of one of the at least one second identifier is valid.

7. A system according to claim 5, wherein at least one of said first and second transferring means comprises:

a leading identification data detection means for detecting, before transferring said at least one second identifier, a leading value of said at least one second identifier;

a final identification data detection means for detecting, before transferring said at least one second identifier, a final value of said at least one second identifier; and a bit map conversion means for converting, before transferring said at least one second identifier, the at least one second identifier into bit map data, where the bit map data begins with a bit corresponding to the final value of the at least one second identifier, each bit of the bit map data corresponds to a possible value, between the leading and final values, of the at least one second identifier, and each bit corresponding to the value of one of the at least one second identifier is valid.

8. A system according to claim 5, wherein in the operation of at least one of said first and second transferring means, the leading value of the at least one first identifier determined in the link between the third node and the first one of said at least one midway node, and the number of the at least one first identifier determined in the link between the third node and the first one of said at least one midway node, are transferred instead of the at least one first identifier.

9. A system according to claim 5, wherein said second node contains means for transferring, to said third node, said at least one second identifier; and said third node contains means for receiving the at least one second identifier from the second node, to store the at least one second identifier in said original identifier storing means.

10. A node apparatus usable in each of a plurality of nodes in a packet communication network, said node apparatus comprising:

unused identifier storing means for storing information on at least one unused identifier each being available for use in identifying a packet directional path in each link incoming to the said each node;

original identifier storing means for storing, as at least one original identifier, at least one first identifier identifying at least one first packet directional path directed to said each node, in a link between a first node which is located one node upstream of said each node on a working path and a second node which is located two nodes upstream of said each node on said working path, where said working path extends from said second node to said each node, and said at least one first packet directional path is logically defined on the working path;

determining means for determining, as at least one second identifier identifying at least one second packet directional path in a link between said each node and one of at least one midway node located one node upstream of said each node on a bypassing path, at least one unused identifier among the at least one unused identifier stored in the unused identifier storing means in said each node, where said bypassing path extends from said second node through said at least one midway node to said each node to bypass said working path, and each of said at least one second directional path is determined so as to correspond to one of the at least one first identifier; and transferring means for transferring to said one of at least one midway node, said at least one first identifier and the at least one second identifier determined by the determining means in the link between said each node and said one of at least one midway node, so that the correspondence between each of the at least one first identifier and one of the at least one second identifier determined in the link between said each node and said one of at least one midway node, is recognizable.

11. A node apparatus usable in each of at least one midway node which a bypassing path in a packet communication network passes through, where said bypassing path bypasses a working path extending from a first node through a second node to a third node, and at least one first identifier is determined for identifying at least one first packet directional path logically defined in a link between the first and second node on the working path, said node apparatus comprising:

unused identifier storing means for storing information on at least one unused identifier each being available for use in identifying a packet directional path in each link incoming to the said each node;

receiving means for receiving, from a downstream-side one of at least one midway node located one node downstream of said each node on the bypassing path, said at least one first identifier and at least one second identifier, and recognizing the correspondence between each of said at least one first identifier and one of said at least one second identifier, where said at least one second identifier identifies at least one second packet directional path in a link between said each node and the downstream-side one of at least one midway node on the bypassing path;

determining means for determining as at least one third identifier identifying said at least one first packet directional path in a link between said each node and an upstream-side one of at least one midway node located one node upstream of said each node on said bypassing path, at least one unused identifier among the at least one available identifier stored by the unused identifier storing means in said each node, so that a correspondence between each of the at least one first identifier and one of the at least one third identifier, is recognizable; and transferring means for transferring, to the upstream-side one of at least one midway node on said bypassing path, said at least one first identifier and the at least one third identifier, so that the correspondence between each of said at least one first identifier and one of said at least one third identifier, is recognizable.

* * * * *

UNITED STATES PATENT AND TRADEMARK OFFICE
CERTIFICATE OF CORRECTION

PATENT NO.    : 6,084,882
DATED         : July 4, 2000
INVENTOR(S)   : Takao Ogura et al.

It is certified that error appears in the above-identified patent and that said Letters Patent is hereby corrected as shown below:

<u>Title page,</u>
Item [30], should read:
-- Jun. 18, 1991 [JP] Japan 3-146127
   Jun. 16, 1992 [WO] PCT/JP92/00764 --

Item [63], should read:
-- Continuation of application No. 08/274,152, Jul. 14, 1994, abandoned, which is a continuation of application No. 07/969,316, Mar. 24, 1993, abandoned, which is a national stage of PCT/JP92/00764, 16 June 1992. --

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.   : 6,084,882
DATED        : July 4, 2000
INVENTOR(S)  : Takao Ogura et al.

It is certified that error appears in the above-identified patent and that said Letters Patent is hereby corrected as shown below:

<u>Title page,</u>
Item [30], should read:
-- Jun. 18, 1991  [JP]  Japan  3-146127 --

Item [63], should read:
-- Continuation of application No. 08/274,152, Jul. 14, 1994, abandoned, which is a continuation of application No. 07/969,316, Mar. 24, 1993, abandoned, which is a national stage of PCT/JP92/00764, 16 June 1992. --

This certificate supersedes Certificate of Correction issued April 8, 2003.

Signed and Sealed this

Twenty-seventh Day of May, 2003

JAMES E. ROGAN
*Director of the United States Patent and Trademark Office*